US008824247B2

(12) United States Patent
Hurley et al.

(10) Patent No.: US 8,824,247 B2
(45) Date of Patent: Sep. 2, 2014

(54) BONDING AGENT FOR HEAT-ASSISTED MAGNETIC RECORDING AND METHOD OF APPLICATION

(71) Applicant: Seagate Technology LLC, Cupertino, CA (US)

(72) Inventors: Jon Paul Hurley, Bloomington, MN (US); Jason Boyd Elledge, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/802,175

(22) Filed: Mar. 13, 2013

(65) Prior Publication Data
US 2013/0279312 A1 Oct. 24, 2013

Related U.S. Application Data (60) Provisional application No. 61/637,256, filed on Apr. 23, 2012.

(51) Int. Cl.
*G11B 11/00* (2006.01)
(52) U.S. Cl.
USPC ........................................ 369/13.02
(58) Field of Classification Search
USPC ............ 369/13.02, 112.01, 121; 372/92, 108;
239/290, 291, 398; 427/96.7, 160, 162,
427/163.2
See application file for complete search history.

(56) References Cited

U.S. PATENT DOCUMENTS 7,864,635 B2 * 1/2011 Shimizu .................... 369/13.02
7,944,800 B2   5/2011 Nishida
(Continued)

FOREIGN PATENT DOCUMENTS

JP        2008010026        1/2008

OTHER PUBLICATIONS

Optomec Inc., Aerosol Jet Materials FAQs, printed from www.optomec.com on Feb. 6, 2013, 2 pages.

(Continued)

*Primary Examiner* — Brenda Bernardi
(74) *Attorney, Agent, or Firm* — Hollingsworth Davis, LLC (57) ABSTRACT

Magnetic write heads for heat-assisted magnetic recording (HAMR) are disclosed that include a laser diode having a light emitting edge or surface mounted on a slider, an optical waveguide, and a printed bonding agent disposed in an air gap between the laser diode and the slider. The printed bonding agent can be applied by ink jet printing or aerosol jet printing. Also included is a method that includes attaching a laser diode to a slider of a magnetic write head and depositing a bonding agent into the air gap using a focused stream of bonding agent. A light-emitting edge or surface of the laser diode is adjacent to an optical waveguide. The light-emitting edge or surface of the laser diode and the optical input of the waveguide define an aligned direction and an air gap extends from the light-emitting edge or surface of the laser diode in a direction perpendicular to the aligned direction. The bonding agent can be applied by ink jet printing or aerosol jet printing.

20 Claims, 12 Drawing Sheets

(56) References Cited

U.S. PATENT DOCUMENTS

| | | | |
|---|---|---|---|
| 8,018,825 B2 * | 9/2011 | Esaki et al. | 369/283 |
| 8,105,956 B2 | 1/2012 | Ho et al. | |
| 8,132,744 B2 | 3/2012 | King et al. | |
| 8,243,561 B2 | 8/2012 | Matsumoto | |
| 8,272,579 B2 | 9/2012 | King et al. | |
| 8,300,503 B2 | 10/2012 | Arai et al. | |
| 8,406,093 B2 | 3/2013 | Iwanabe et al. | |
| 2010/0214685 A1 | 8/2010 | Seigler et al. | |
| 2012/0044967 A1 | 2/2012 | Cole et al. | |
| 2012/0048609 A1 | 3/2012 | Ohnuki | |
| 2012/0231576 A1 | 9/2012 | King et al. | |
| 2012/0320719 A1 | 12/2012 | Arai et al. | |
| 2013/0029032 A1 | 1/2013 | King et al. | |

OTHER PUBLICATIONS

Optomec Inc., Aerosol Jet 300 Series Systems, printed from www.optomec.com on Feb. 6, 2013, 2 pages.

Optomec Inc., Aerosol Jet Display Lab System, printed from www.optomec.com on Feb. 6, 2013, 2 pages.

U.S. Appl. No. 13/788,860, filed Mar. 7, 2013, Yang et al.

Renn, "M3D Aerosol-Jet Printing—5 Microns to 5 Millimeters", Optomec, p. 4, 6, 7, 9, Retrieved from the internet: www.nanotxstate.org/presentation/NAC_14_Jul_2008.pdf.

ISR and Written Opinion Aug. 9, 2013 for application serial No. PCT/US2013/037815.

Chen et al., "Inkjet Printing for Optical/Electrical Interfacing of VCSEL and PD Arrays", MicroFab Technologies, Inc., 2003, pp. 1-5.

* cited by examiner

BONDING AGENT FOR HEAT-ASSISTED MAGNETIC RECORDING AND METHOD OF APPLICATION

RELATED APPLICATIONS

This application claims the benefit of Provisional Patent Application Ser. No. 61/637,256 filed on Apr. 23, 2012, to which priority is claimed pursuant to 35 U.S.C. §119(e) and which is hereby incorporated herein by reference in its entirety.

SUMMARY

Various embodiments disclosed herein are generally directed to methods, systems, and apparatuses that facilitate coupling a laser diode to a magnetic writer that includes a magnetic write head. In one aspect, a magnetic write head includes a laser diode having a light-emitting edge or surface mounted on a slider. The disclosed write head also includes an optical waveguide and a printed bonding agent disposed in an air gap between the optical waveguide and the light-emitting edge or surface. The printed bonding agent is applied by ink jet printing or aerosol jet printing and, in some embodiments, can be configured to optically couple the laser diode to the optical waveguide.

In another aspect, a method is disclosed that includes attaching a laser diode to a slider of a magnetic write head. The laser is oriented so that a light-emitting edge or surface of the laser diode is adjacent to an optical waveguide coupler. The light-emitting edge or surface of the laser diode and the optical input of the waveguide define an aligned direction. An air gap extends from the light-emitting edge or surface of the laser diode in a direction perpendicular to the aligned direction. The method further includes depositing a bonding agent into the air gap using a focused stream of bonding agent. In some embodiments, the focused stream of bonding agent is focused aerodynamically.

In the present disclosure:

"aerodynamically focused" refers to a process such as aerosol jet printing where a stream of sheath gas is used to narrowly focus a stream of printing ink;

"ink" refers to material that has been printed or a printed bonding agent—the ink may be an optical dielectric or adhesive according to this present disclosure; and "printed bonding agent" refers to a bonding agent that has been precisely applied in a precise pattern using printing technologies such as ink-jet printing or aerosol jet printing;

The above summary is not intended to describe each disclosed embodiment or every implementation of the present disclosure. The Figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another Figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

One way to achieve a tiny confined hot spot is to use an optical near-field transducer (NFT), such as a plasmonic optical antenna or an aperture, located near an air bearing surface of a hard drive slider. Light may be launched from a light source (e.g., a laser diode) into optics integrated into a slider. An example of such integrated optics includes a waveguide formed from core and cladding layers with high contrast between respective refractive indices. Light propagating in the waveguide may be directed to an optical focusing element, such as a planar solid immersion mirror (PSIM). The PSIM may concentrate the energy into a NFT. The NFT causes the energy to be delivered to the media in a very small spot.

A waveguide, NFT, and PSIM are examples of integrated optical devices that are formed within the slider. The field of integrated optics generally relates to the construction of optics devices on substrates, sometimes in combination with electronic components, to produce functional systems or subsystems. For example, light may be transferred between components via waveguides that are built up on a substrate using layer deposition techniques. These waveguides may be formed as a layer of materials, with a middle core layer having a relatively high refractive index, and top/bottom cladding layers of relatively low refractive index. Other optical components may be formed in similar fashion, including the NFT and PSIM discussed above.

In a HAMR slider, light is launched into these integrated optics components from a light source such as a laser diode. One way to launch light into a slider is from an externally mounted laser via an optical waveguide or grating coupler fabricated on or in a slider. When the externally mounted laser is on a slider the configuration is known as laser-on-slider (LoS) light delivery. The laser diode can be mounted in several different configurations on the slider. In one embodiment, the laser can lie flat on the slider. In this configuration, if the laser diode is an edge-emitting laser device, then some optics (such as a mirror) may be required to direct the light emanating from the emitting facet of the laser diode into the integrated optics of the slider. In another configuration the laser diode can lie in a vertical plane to the slider allowing light emanating from the laser diode to be inserted directly into the integrated optics in the slider. A submount assembly may be required with LoS configurations to hold the laser diode in position.

Another way is to configure a laser light source to sit in a recessed cavity in the slider allowing the laser output to enter integrated optics of the slider through a vertical wall in the side of the cavity. This configuration is known as laser-in-slider (LiS). These configurations are shown below in the Figures. A laser-in-slider may also use a submount between the laser diode and the slider cavity.

In laser-on-slider and laser-in-slider configurations, light is launched from the emitting facet of a laser diode into an optical waveguide. The emitting facet can be an edge from, for example, an edge-emitting laser diode. LoS and LiS light delivery can be integrated at a wafer level and both types may be suitable for mass production. Even though LoS and LiS light delivery may be a prime candidate for mass production, there are many challenges in producing such devices. For example, while many small-scale electromagnetic and mechanical features can be formed using techniques developed and refined over the years for forming highly complex electronics (e.g., processors), a HAMR device must also integrate optical devices into these assemblies. Further, specifically for LoS, a separately formed laser diode may need to be assembled to the slider that may require alignment tolerances on the order of tenths of a micrometer. Additionally, there can be light loss in both forms of light delivery due to contamination, refractive index mismatch reflections and interference (Fabry-Perot effect).

One way to overcome the problems of alignment, contamination, and light loss is to fill any gap between the laser diode having a light-emitting edge or surface and the optical waveguide. The present disclosure provides a method for applying optical grade, void-free printed bonding agents to fill in the gap, typically a high aspect ratio gap, between the laser diode output facet and the input optical waveguide in a magnetic write head. The printed bonding agents can be precisely placed in the gap and can act as encapsulation materials to protect the laser diode, optical coupler, and the light path between the two. Additionally, the printed bonding agents can be used to seal the laser diode to the cavity of a laser-in-slider configuration or can be used to seal a submount to which a laser diode is attached to a slider in a laser-on-slider configuration. Printed bonding agents are typically high refractive index dielectric materials. The use of high refractive index dielectric encapsulants can provide an optical path with good uniformity, low optical loss, minimum stress, minimum Fabry-Perot effect, and can be done easily in mass production. In particular it has been found sprayable encapsulants delivered using an aerosol jet can precisely and accurately place the encapsulant in the small air gap between the laser diode output facet and the input optical waveguide without contaminating other parts of the write head.

Figure 1:
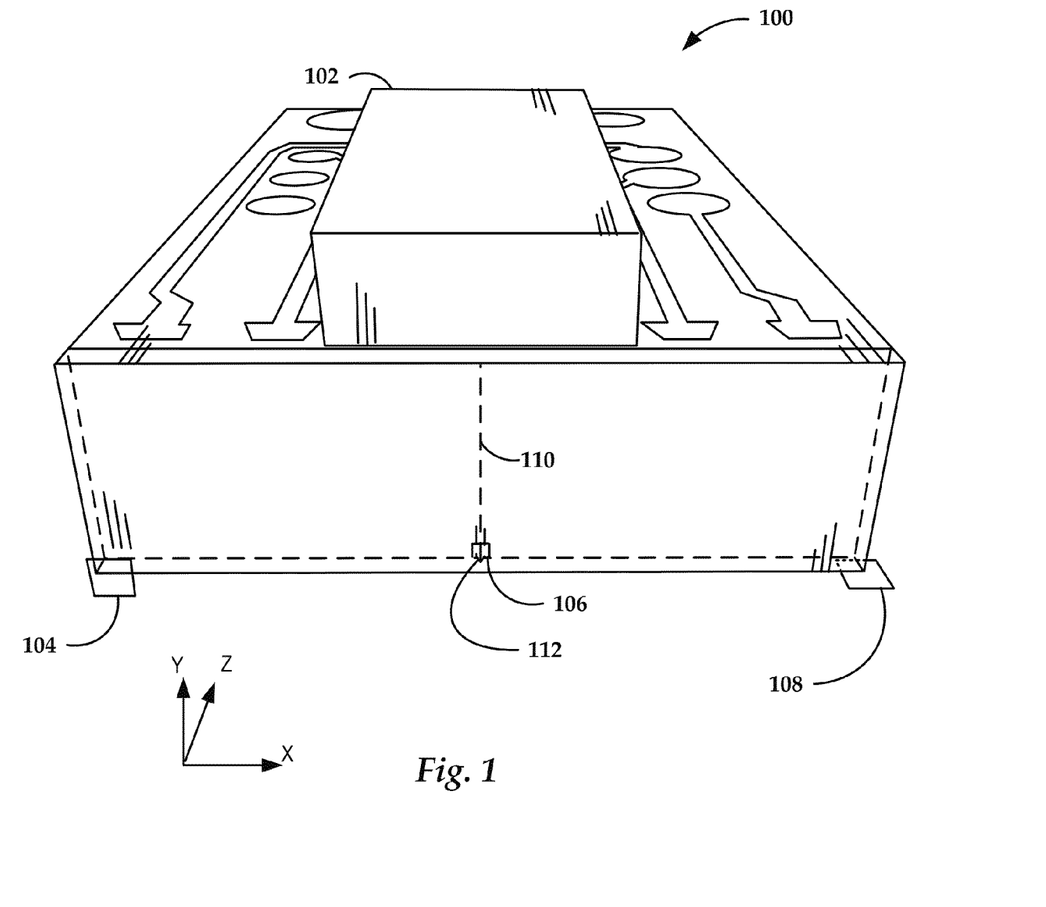
FIG. 1 is a perspective view illustrating various features of an embodiment of a laser-on-slider (LoS) wherein the laser diode lies flat on top of the slider.

In reference now to FIG. 1, a perspective view illustrates various features of slider 100 according to an example embodiment. In this example, slider 100 includes laser diode 102 on top of the slider body and near trailing edge 104 of slider 100. Laser diode 102 provides electromagnetic energy to heat the media surface at a point near to HAMR read/write head 106, read/write head 106 located at air-bearing surface (ABS) 108. In some cases, air-bearing surface 108 may be referred to as a media-facing surface. Air-bearing surface 108 faces and is held proximate to a moving media surface (not shown) during device operation.

Optical coupling components, such as waveguide 110, are formed integrally within slider device 100 to deliver light from laser diode 102 to the media. For example, a waveguide and near-field transducer (NFT) 112 may be located proximate read/write head 106 to provide local heating of the media during write operations. Laser diode 102 in this example may be an edge firing device, e.g., delivering light along the z-axis, the light being reflected into waveguide 110 by a mirror or similar device. It will be appreciated that waveguide 110 and NFT 112 may be used with any light source and light delivery mechanism. For example, surface emitting lasers (SEL) may be used instead of edge firing lasers. Slider 100 may use an integrated laser located on the top, side, trailing edge, etc., and/or the light may be provided by a separate externally mounted laser (not shown).

In this example, laser diode 102 is approximately 500 µm long, 90 µm wide (horizontal dimension in the orientation of FIGS. 1), and 100 µm tall. Laser diode 102 is mounted on top of slider 100, but laser diode 102 may also be recessed in cavity of slider 100. Solder bumps (not shown) on slider 100 interface with corresponding solder bumps or pads formed on laser diode 102. The solder bumps facilitate bonding laser diode 102 to slider 100, and may provide alignment, heat sinking and electrical connectivity for laser diode 102.

During assembly, laser diode 102 is precisely aligned with optical waveguide 110 to ensure sufficient energy is delivered to the media. However, at an optical coupling region, a narrow gap (not shown) may be formed due to an adjustment tolerance for mounting laser diode 102 to slider 100. The gap can be from about 0.25 µm to about 10 µm across, from about 0.5 µm to about 2.5 µm across, or from about 0.25 µm to about 1.0 µm across and, typically about 5 to 6 times that distance in depth. The presence of the gap may result in a loss of energy delivered to the media.

Figure 2:
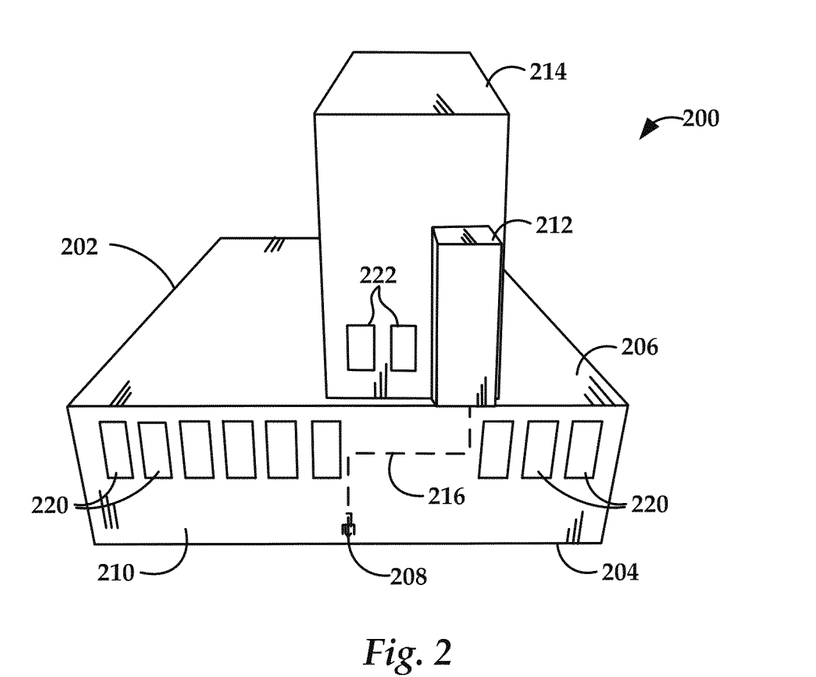
FIG. 2 is a perspective view illustrating various features of another embodiment of a laser-on-slider (LoS) device wherein the laser diode is mounted vertically to a submount located on top of the slider.
Figure 3:
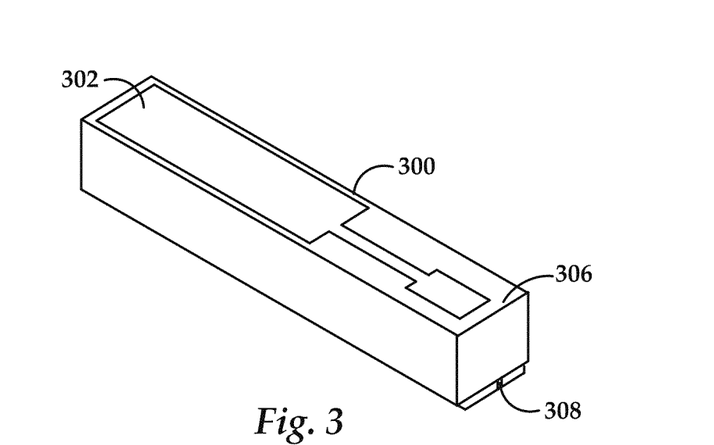
FIG. 3 is a perspective view illustrating the laser diode shown in FIG. 2.

FIG. 2 is a perspective view illustrating various features of another embodiment of a laser-on-slider (LoS) device wherein the laser diode is mounted vertically on top of the slider using a submount. FIG. 3 shows a perspective view of laser diode 300 that is mounted on submount 214. Slider assembly 200 shows slider body 202 with submount 214 and laser 212 mounted upon it. Submount 214 includes laser mounting surface 206 that interfaces with a mounting surface 306 of the laser 212 (the mounting surface is hidden in this view, but visible in FIG. 3). The mounting surface of submount 214 may include thermal and/or conductive bonding pads (not shown in this view). A lower surface of submount 214 interfaces with a region of the slider body 202. Submount 214 includes electrical bonding pads 222 that are conductively coupled to traces of a head-gimbal assembly. As seen in FIG. 3, the laser 300 also includes a bonding pad 302 that is coupled to traces of a head-gimbal assembly and an output facet 308 that delivers light from a lower surface into slider 202. Bonding pads 302 (as well as patterned bonding pads 222 of submount 214) may serve as a heat sink as well as a conductive trace.

Figure 4:
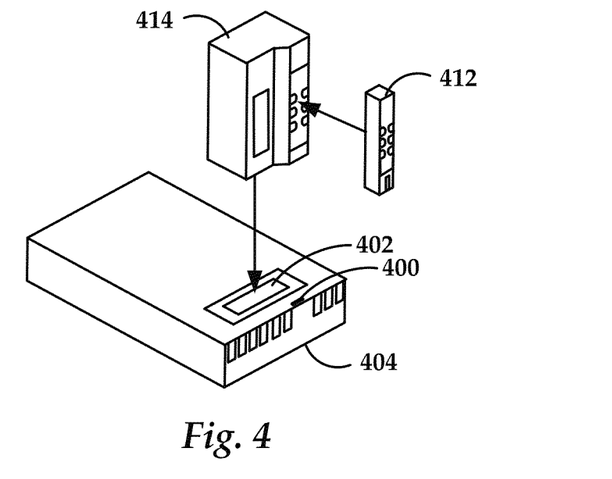
FIGS. 4 and 5 are perspective views of the embodiment of the present disclosure of FIG. 2 showing how the laser diode mounts to the submount and how the submount is attached to the slider.
Figure 5:
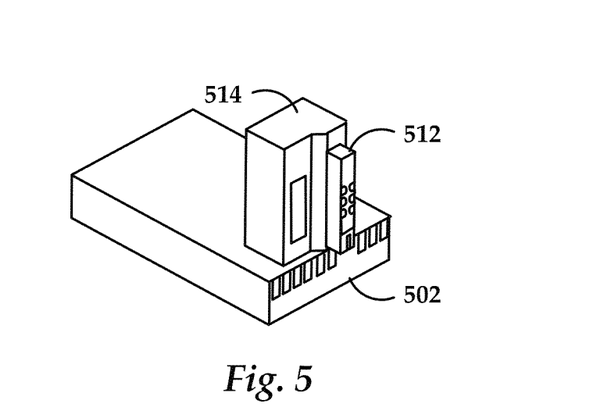

FIGS. 4 and 5 show top perspective views of an embodiment of a vertically mounted LoS device and illustrate how the laser diode, subassembly, and slider are mounted. In FIG. 4, laser diode 412 is mounted on subassembly 414 so that electrical and thermally conductive pads on submount 414 contact similar features on the backside of laser diode 412. Submount 414 is then mounted on conductive pad 402 on top surface 400 of slider 404. FIG. 5 shows laser diode 512 mounted to subassembly 514 which is mounted on slider 502.

Figure 6:
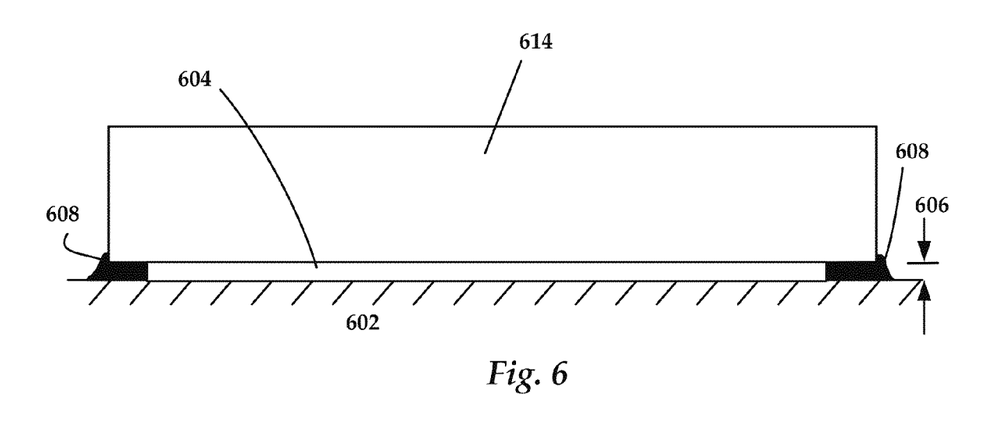
FIG. 6 is a side view showing a bonding agent in the air gaps.

FIG. 6 is a side view illustration of a laser diode mounted on a slider with no subassembly as shown in FIG. 1. Laser diode 614 is mounted atop slider surface 602 and is electrically and thermally connected to slider surface 602 through gap 604, which can be a bond line and can contain solder. Gap 604 has bond line thickness 606 between laser diode 614 and slider surface 602. Gap 604 can be filled with bonding agent 608 for protection as will be described herein.

Figure 7:
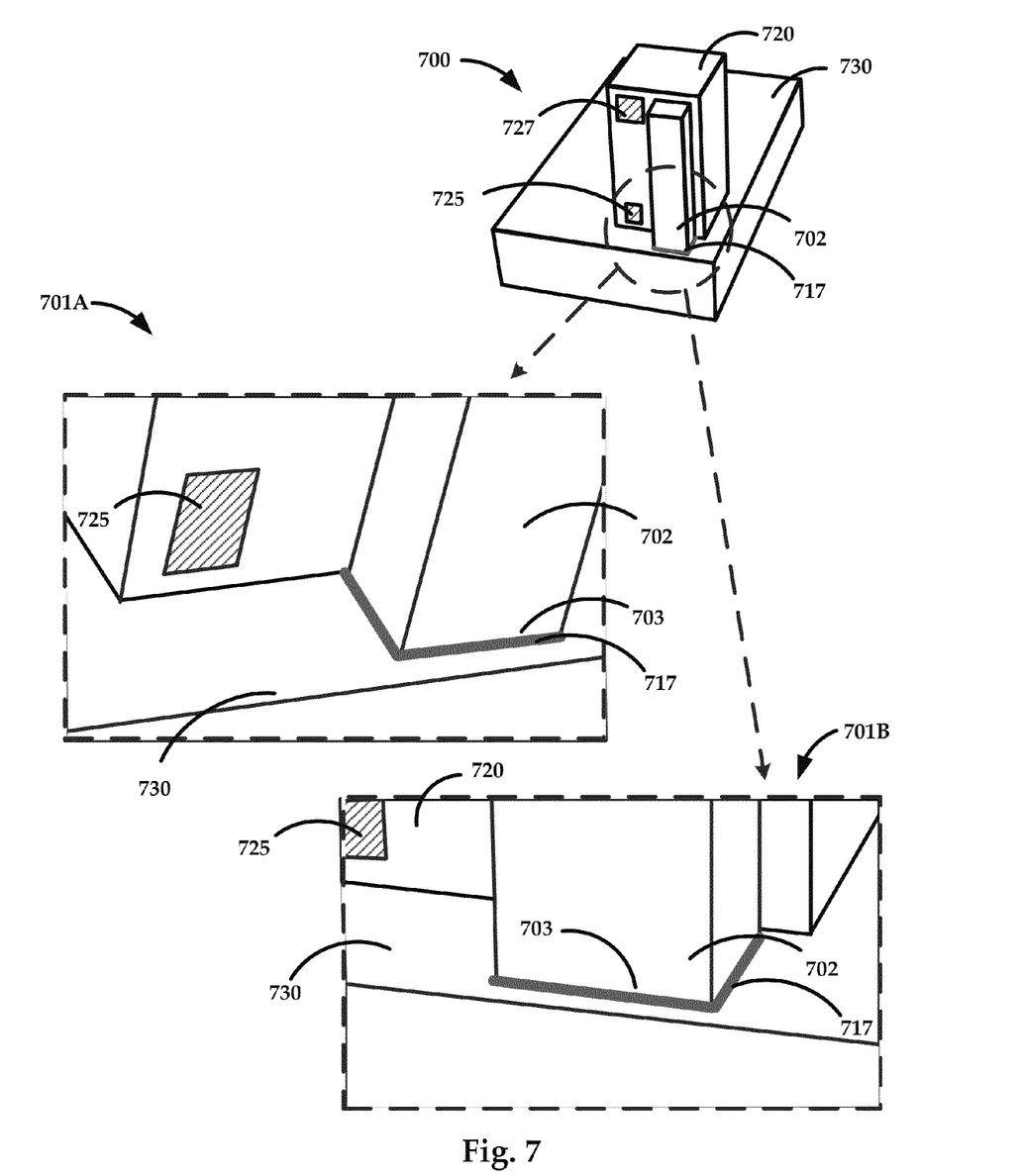
FIG. 7 is a perspective view of a subassembly of a vertically mounted laser diode on a submount of a laser-on-slider device.

FIG. 7 is a perspective view of an embodiment of a vertically mounted laser diode on a slider showing gaps that have been filled with sprayable adhesive. FIGS. 701A and 701B are magnified insets showing more detail. Laser-on-slider assembly 700 has laser diode 702 mounted on submount 720 which is mounted onto slider 730 as shown. Laser diode 702 leaves air gap 703 between the laser diode and the slider platform after mounting. Bonding agent 717 can be used to fill air gap 703. Bonding agent 717 is preferably a sprayable adhesive. Laser-on-slider assembly 700 has metal bond pads 725 and 727 used to mount laser-on-slider assembly 700 to other parts of the HAMR read/write device. It is important that material applied as bonding agent 717 does not cover any bond pads or electrical contacts that may be on the sides of slider 730 so precise application of bonding agent 717 is very important.

Figure 8:
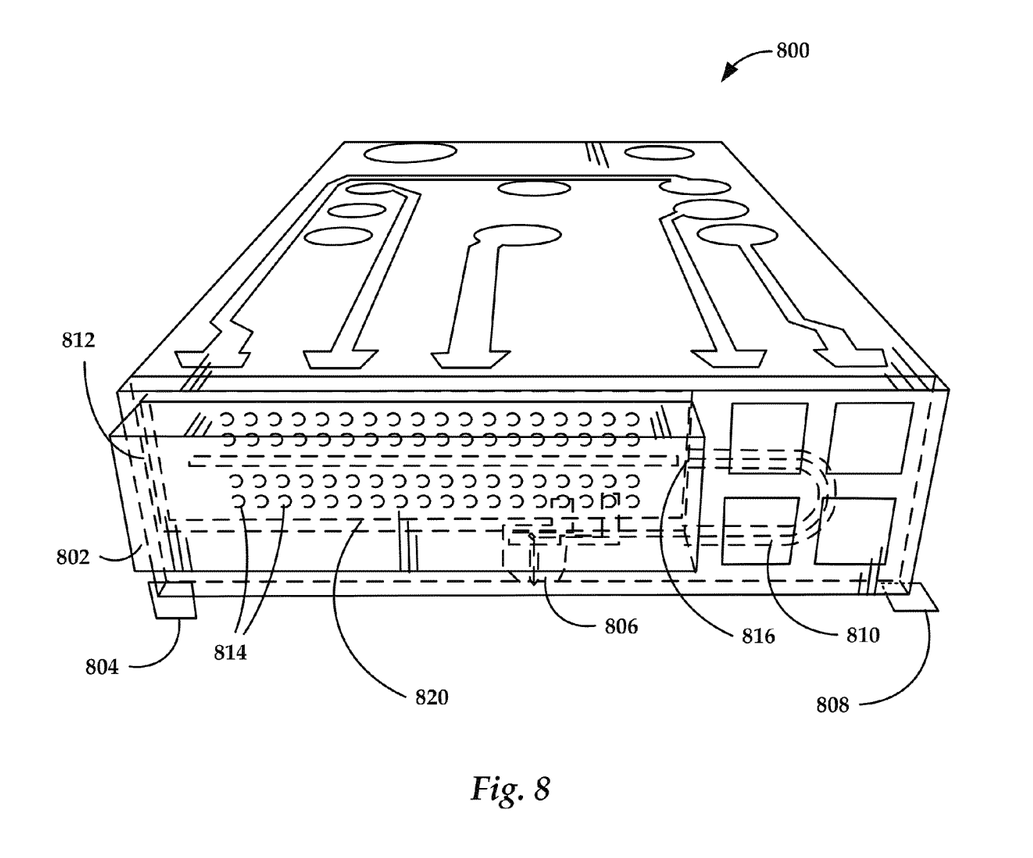
FIG. 8 a perspective view illustrating various features of a laser-in-slider device.

In reference now to FIG. 8, a perspective view illustrates various features of laser-in-slider device 800 according to an example embodiment. In this example, edge-emitting laser diode 802 is mounted onto trailing edge surface 804 of slider 800. Laser diode 802 is proximate to HAMR read/write head 806, which has one edge on air bearing surface 808 of slider 800. Air bearing surface 808 is held proximate to a moving media surface (not shown) during device operation. Laser diode 802 provides electromagnetic energy to heat the media surface at a point near read/write head 806. Optical coupling components, such as waveguide 810, are formed integrally within slider device 800 to deliver light from laser 802 to the media. In this example, laser diode 802 is approximately 500 µm long, 90 µm wide (vertical dimension in the orientation of FIGS. 8), and 100 µtm tall. Laser diode 802 is recessed in cavity 812 formed in trailing surface 804 of slider 800. Cavity 812 may be formed such that there is an air gap surrounding laser 802 diode that allows for tolerance adjustment during assembly. The bottom of cavity 812 includes solder bumps 814 that interface with corresponding bumps/pads formed on laser diode 802. Solder bumps 814 facilitate bonding laser diode 802 to slider 800, and provide electrical connectivity for laser diode 802. Solder bumps 814 may also provide other functions including alignment and heat sinking of laser diode 802. During assembly, laser diode 802 is precisely aligned with optical waveguide 810 to ensure sufficient energy is delivered to the media. At an optical coupling region, laser diode 802 includes an output facet that is aligned to launch light into input optical coupler 816 of optical waveguide 810. Input optical coupler 816 may be formed from edge of waveguide 810 in a sidewall of the cavity 812. In one embodiment, cavity 812 may include a narrow air gap (e.g., approximately 0.25-1.0 µm) between input optical coupler 816 and the output facet of the laser 802 to facilitate alignment there between.

Figure 9:
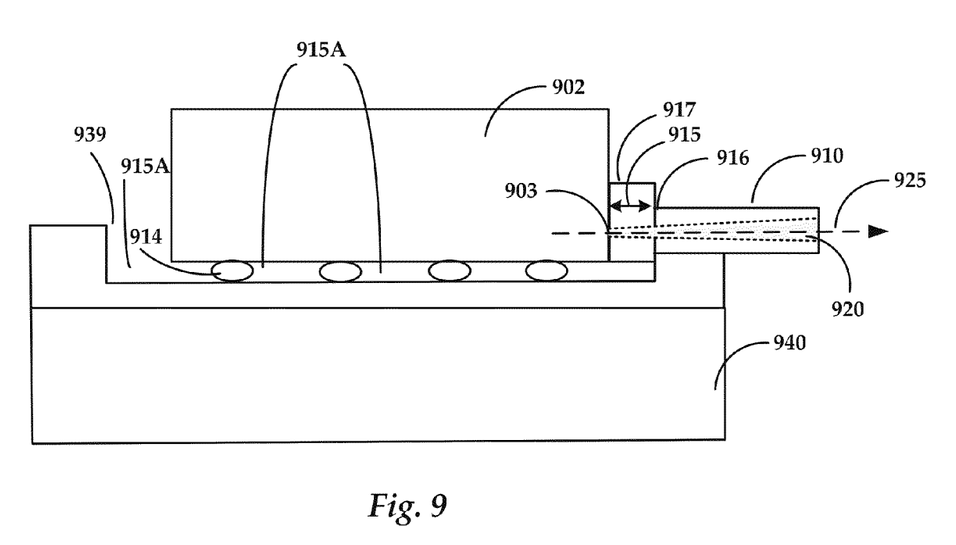
FIG. 9 is a top view of a laser-in-slider assembly showing bonding agent disposed the air gap between the laser diode and the optical waveguide.

Shown in FIG. 9 is a top view of a laser-in-slider assembly that includes laser diode 902 disposed in cavity 939 formed on top of slider 940. Laser diode 902 makes contact with solder bumps 914 located within cavity 939 which provide electrical energy to laser diode 902. When laser diode 902 is disposed within cavity 939, air gap 915 is formed between the output facet 903 of laser diode 902 and optical waveguide 910 having light-conducting core 920. FIG. 9 includes laser diode 902 having output facet 903 that includes a light-emitting edge or a light-emitting surface, optical waveguide 910 having input optical coupling end 916, and bonding agent 917 disposed in the gap between optical waveguide 910 and laser diode output facet 903. Output facet 903, input end of optical coupling end 916 and light-conducting core 920 define aligned direction 925. Air gap 905 extends in a direction perpendicular to the aligned direction. Bonding agent 917 used to fill gap 915 is configured to optically couple laser diode 902 to optical waveguide 910. In some embodiments, bonding agent 917 can just fill the gap 915 between the light-emitting edge or surface of the laser diode and the optical waveguide as shown in FIG. 9. In other embodiments the bonding agent can additionally fill the entire gap 915 and 915A between the laser diode and the slider into which it has been placed. Bonding agent 917 may have an index of refraction greater than 1.6 as well as an average transmission of about 90% or greater at wavelengths emitted by laser diode 902. Bonding agent 917 may have an index of refraction of about 1.7 to match the input waveguide coupler. Moreover, bonding agent 917 may be disposed in gap 915 through a variety of means including aerosol jetting.

Figure 10:
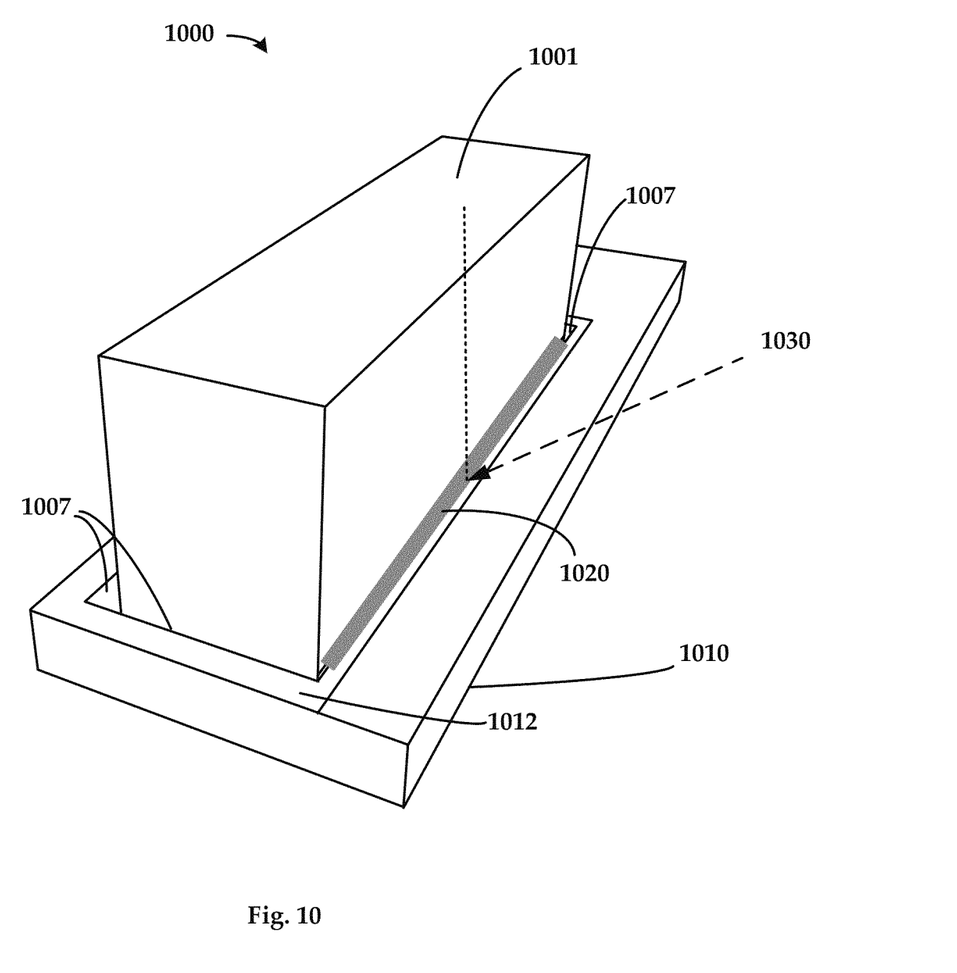
FIG. 10 is a perspective view of a laser diode in a laser-in-slider showing bonding agent.

FIG. 10 is a perspective view of a laser-in-slider embodiment of a portion of the disclosed magnetic write head. FIG. 10 laser-in-slider 1000 in which laser diode 1001 has been mounted in a cavity in slider body 1010. Laser diode 1001 is mounted so that it makes electrical contact with solder bumps located in the bottom of the cavity. Air gap 1007 is left between the laser diode and the slider (shown in several locations around laser diode 1001). Bonding agent 1020 has been applied to a portion of air gap 1007 as shown to form a bonding layer and fill the air gap. In the laser-in-slider configuration shown in FIG. 10, it is important that bonding agent 1020 be confined to a small area (area 1012) around the cavity into which laser diode 1001 is mounted. It is preferable that bonding agent 1020 be applied at an angle from a vertical reference (shown as a dotted line) shown by dashed arrow 1030 in FIG. 10. In one embodiment, where aerosol jetting is used for application of the bonding agent, bonding agent 1020 may be dispensed at approximately 45 degrees from the vertical reference.

Figure 11A:
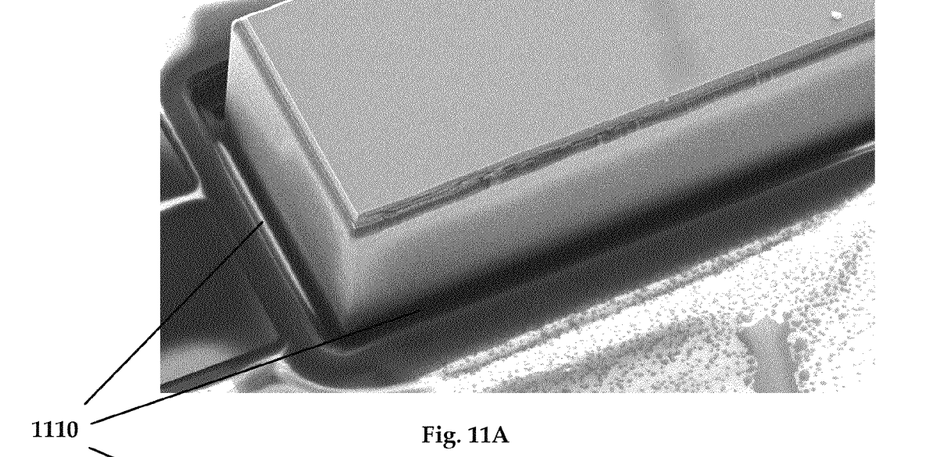
FIGS. 11A and 11B are photomicrographs of a laser diode mounted in a cavity of a laser-in-slider device.
Figure 11B:
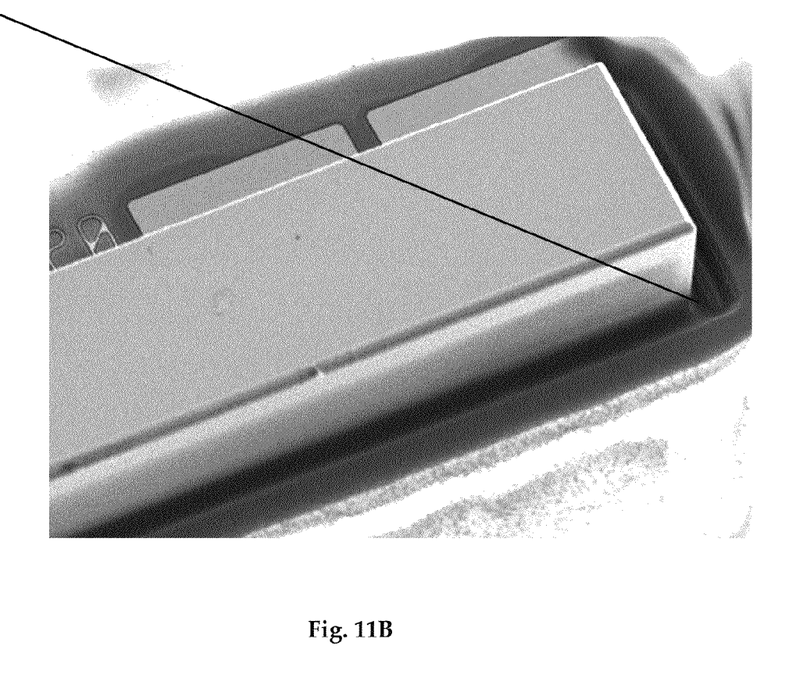

FIGS. 11A and 11B are photomicrographs of two different perspectives of a disclosed embodiment of a laser diode mounted in a cavity of a laser-in-slider. Bonding agent 1110 is shown placed along various side edges of the laser diode in the recessed cavity. The bonding agent has been dispensed along the sides and along the ends of the laser diode and has been applied without overfilling the cavities.

The disclosed magnetic write head includes a bonding agent disposed in an air gap between the laser diode and the slider. In some embodiments, the air gap can be located between the optical waveguide and the light-emitting edge or surface, the bonding agent configured to optically couple the laser diode to the optical waveguide. In these embodiments, wherein the magnetic write head includes a laser-in-slider configuration, the bonding agent can act as an encapsulation layer that can fill the cavity and retain the laser diode in the cavity. Typical bonding agents can be adhesives. When the bonding agent is disposed in the air gap between the optical waveguide and the light-emitting edge or surface, the bonding agent can be configured to optically couple the laser diode to the optical waveguide. In these cases, the bonding agent can be an optical adhesive that can form a conduit (light path) through which the light emanating from the laser diode can be conducted towards and into the optical waveguide. Thus, the optical adhesive needs to be substantially transparent to the wavelength of light emitted by the laser diode to minimize light loss so that enough energy reaches the recording medium. By substantially transparent it is meant that greater than 70%, greater than 75%, greater than 80%, greater than 85%, greater than 90%, or even greater than 90% of the light that is inserted into the optical adhesive by the laser diode, is injected into the input of the optical waveguide. Additionally, the optical adhesive can be substantially clear and free of defects, such as particulates or voids that can scatter the light emitted from the laser diode. Finally, the optical adhesive can resist causing degradation optical adhesive which can degraded the light path through the optical adhesive over time.

For the laser-on-slider configuration, the laser diode is mounted onto a submount that is flush on a surface of the slider and may not be in the optical path from the light-emitting edge or surface of the laser diode and the optical waveguide. In this case, the encapsulation material can be an adhesive that fills the gap between the submount containing the laser diode and the slider. The adhesive, in this configuration, may not need to be transparent if it is not in the optical path of light from the laser diode. In this case the requirements of the adhesive are that it not degrade any of the electrical or optical components of the laser-on-slider and that it essentially seals the gap between the submount and the slider.

The bonding agent can be a curable dielectric material. The curable dielectric material can have an index of refraction that essentially matches that of the output facet of the laser diode and the input of the optical waveguide to maximize optical throughput. The present disclosure provides for optical grade, void-free bonding agents to fill in the high aspect ratio gap (aspect ratio of between about 5 and about 6) between the laser diode output facet and the input optical waveguide. These bonding agents are preferably high refractive index dielectric materials. The use of high refractive index dielectric bonding agents can provide an optical path with good uniformity, low optical loss, minimum stress, minimum Fabry-Perot effect, and can be done easily in mass production. In particular it has been found that bonding agents applied by jetting (ink jetting or aerosol jetting) can quickly and effectively dispense suitable adhesives, typically optical adhesives, in a short amount of time.

Typical bonding agents can be applied by ink jet or aerosol jet technologies. For ink jet application, the bonding agent can have a viscosity of below about 40 centipoises (cps), for example between 8 cps and 12 cps, at the print head temperature which is typically at about 100° C. For aerosol jet printing applications, the bonding agent can have a viscosity of between about 1 to 1000 cps at application temperature. For both applications, a thixotropic (shear thinning) material is preferred. In some embodiments, the bonding agent can be filled with between about 5 weight percent (wt %) and about 70 wt % of solids, usually in the form of nanoparticles. Nanoparticles can include inorganic nanoparticles and carbon nanotubes, nanospheres, nanowires, etc. The particles can have a diameter of 300 to 500 nm maximum and typically have a diameter of less than about 200 nm. It is preferred that for optically clear applications that the size of the particles or their agglomerates be less than the wavelength of light (typically infrared for HAMR application).

Figure 12:
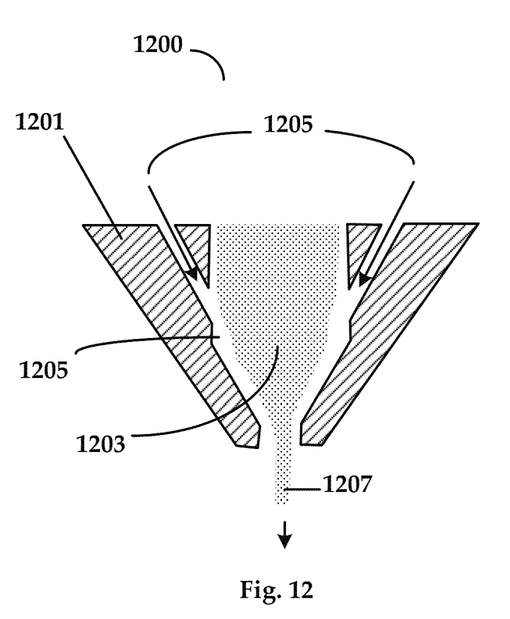
FIG. 12 is a drawing of an aerosol jet printing head.

For the disclosed application, aerosol jet printing has been found to be a preferred method of directing a focused stream of bonding agent to a desired location in a fast and efficient manner. FIG. 12 shows nozzle 1200 of an AEROSOL JET available from Optomec, Albuquerque, N. Mex. useful for aerosol jet printing. Nozzle 1200 has solid body 1201 through which sheath gas 1205 can be inserted so that is flows rapidly along the side of an aerosol stream 1203 of bonding agent. Sheath gas 1205 has a higher velocity than that of aerosol steam 1203 so that it can focus bonding agent aerosol stream 1203 into focused stream 1207. Sheath gas 1205 creates an annular flow around aerosol stream 1203 and collimates aerosol stream 1203. Focused stream 1207 can then be directed to a target location. Focused stream 1207 is dependent upon the physical parameters of the nozzle, the flow characteristics of the aerosol, and the speeds of the aerosol and the sheath gas respectively. Typically, focused stream 1207 can have a diameter of less than about 10 µm and can have a diameter of less than about 5 µm, less than 2 µm, or even less than 1 µm. A typical nozzle can have a diameter of about 3 mm or greater. The sheath gas can be any gas that is substantially inert to the aerosol stream and is typically nitrogen, argon, or, in some embodiments air. Other gases can be used for specialized aerosols.

Figure 13A:
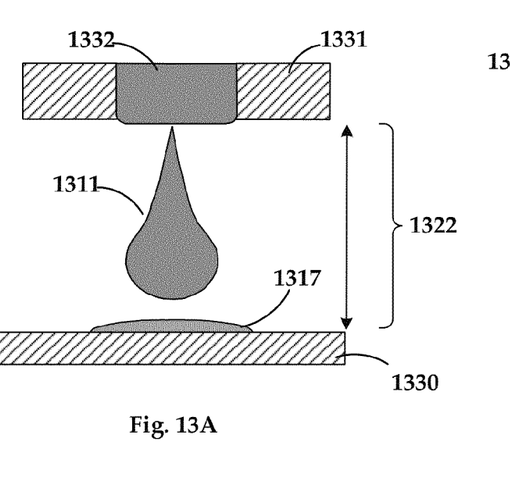
FIG. 13A is a side view schematic of the operation of an ink jet device.
Figure 13B:
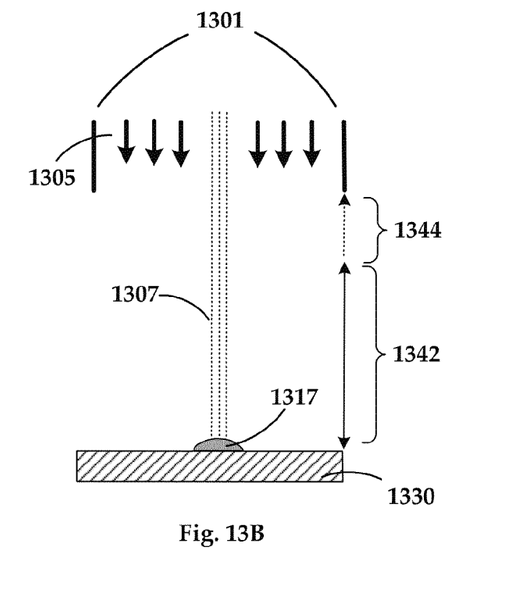
FIG. 13B is a side view schematic of the operation of an aerosol jet device.

FIGS. 13A and 13B show the operation of ink jet nozzle delivery and aerosol jet printing technology respectively. FIG. 13A is an illustration of an embodiment of an ink jet nozzle. Nozzle 1331 has orifice 1332 through which ink is pumped. After passing through orifice 1332, ink droplet 1311 is formed which then can form ink spot 1317 on substrate 1330. Typically, the fixed standoff distance between nozzle 1331 and substrate 1330 is around 1 mm (1000 µm) for optimal operation. Ink droplet 1311 typically has a diameter of about 30 µm. Multiple ink droplets are randomly directed making ink spot 1317 relatively large. Ink drop 1311 typically can be about 200 times the volume of an ink drop produced by aerosol jet printing (see FIG. 13B). Additionally, as described above, inks for ink jetting have to be low density inks (need low viscosity at delivery) for effective use.

FIG. 13B is an illustration of aerosol jet printing technology. Output end of aerosol jet nozzle 1301 emits tightly focused stream of droplets 1307. Droplets 1307 are contained into a narrow stream by sheath gas 1305. Typical droplet size is from about 1 μm to about 5 μm. Typically, distance between the output end of aerosol jet nozzle 1301 and substrate 1330 can vary from the minimum standoff distance 1342 to the maximum standoff distance 1342+1344 which is from about 1 mm to about 5 mm. Aerosol jetted spot 1317 has a very small diameter due to the focusing of the aerosol jet nozzle. The high exit velocity of the aerosol stream enables a relatively large separation between the print head and the substrate, typically 1 mm to about 5 mm. The aerosol stream remains tightly focused over this distance, resulting in the ability to print conformal patterns on three-dimensional substrates. Despite the high velocity, the printing process is gentle and substrate damage does not occur. There is typically no splatter or overspray from the droplets. Placement of the aerosol stream can be accomplished by attaching the substrate to a computer controlled platen or by translating the deposition head while the substrate position remains fixed. Once deposited, the aerosol jet printed ink drops can undergo a thermal, chemical, or photochemical post-treatment to attain mechanical and adhesive properties.

Aerosol jet printing technology can be used to deliver a wide variety of dielectrics and adhesives useful in the disclosed application. Typical dielectrics and adhesives that can be utilized in the disclosed magnetic write head and method include, but are not limited to, polyimides, such as those available from Aldrich Chemicals, Milwaukee, Wis. or CORN XLS fluorinated polyimide available from Mantech Materials, Huntsville, Ala.; polyvinyl pyrrolidone, such as that available from BASF, Florham Park, N.J.; tetrafluoroethylene, available from DuPont, Wilmington, Del.; photoresists such as epoxy-based negative photoresist SU-8, available from Gersteltec, Pully, Switzerland; and adhesives (UV and heat curable) available from Henkel, Dusseldorf, Germany, Loctite Corporation (Henkel), Norland (Cranbury, N.J.), Summers Optical (Hatfield, Pa.), Sun Chemical (Parsippany, N.J.), or other optical adhesives available from a variety of vendors.

Figure 14:
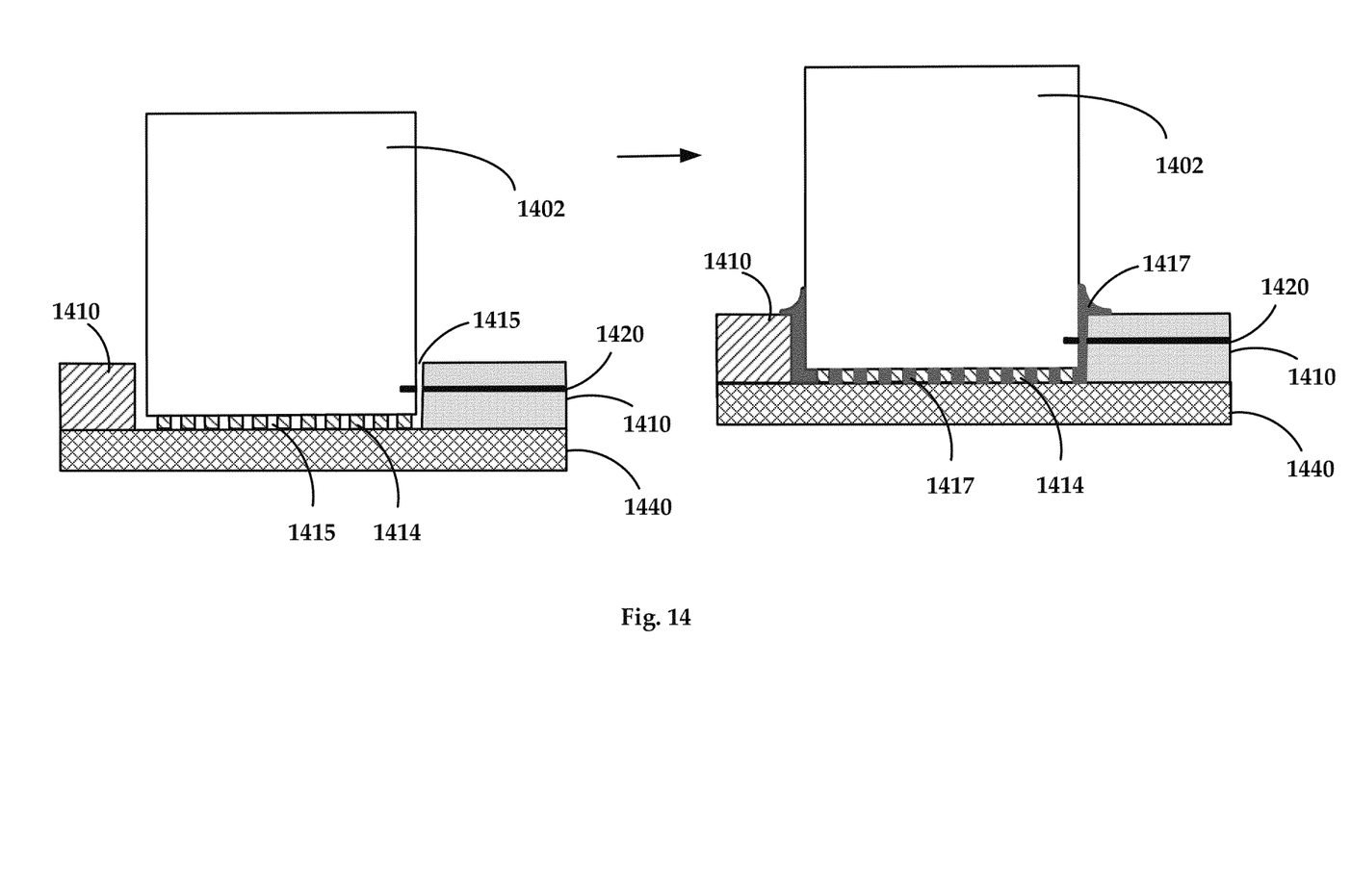
FIG. 14 is a side view of a laser mounted in a cavity of a laser-in-slider device showing the air gap before and after it has been filled with a bonding agent.

FIG. 14 is an illustration of the disclosed method of attaching a laser diode to a slider of a magnetic write head and depositing a bonding agent into the air gap using an aerodynamically focused stream of bonding agent. FIG. 14 shows a laser-in-slider configuration. The slider includes slider 1440 having laser diode 1402 disposed in a cavity bounded by cavity walls 1410. Laser diode 1402 is electrically connected through solder bumps 1414 which lie at bottom of the cavity. Laser diode 1402 produces a light beam that exits laser diode 1402, traverses air gap 1415 and then enters optical waveguide 1420. Bonding agent 1417 is applied to gap 1415 between laser diode 1402 and optical waveguide 1420 as well as gaps 1415 that exist between solder bumps 1414 and on the backside of laser diode 1402. Bonding agent 1417 makes a seal between laser diode 1402 and slider 1440. As depicted in FIG. 14, bonding agent 1417 completely fills (and somewhat overfills) gap 1415. In some embodiments, bonding agent 1417 is contained within gap 1415.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A magnetic write head comprising:
    a laser diode having a light-emitting edge or surface mounted on a slider;
    an optical waveguide; and
    a printed bonding agent disposed on at least one corner between the laser diode and the slider, wherein the printed bonding agent fills an air gap therebetween.

2. A magnetic write head according to claim 1, wherein the printed bonding agent is applied by ink jet printing or aerosol jet printing.

3. A magnetic write head according to claim 2, wherein the printed bonding agent is applied by aerosol jet printing.

4. A magnetic write head according to claim 1, wherein the laser diode, optical waveguide, and bonding agent are components of a laser-on-slider device.

5. A magnetic write head according to claim 1, wherein the laser diode, optical waveguide, and bonding agent are components of a laser-in-slider device.

6. A magnetic write head according to claim 1, wherein the bonding agent comprises a dielectric or adhesive.

7. A magnetic write head according to claim 6, wherein the bonding agent has an average transmission of about 90% or greater at wavelengths emitted by the laser diode.

8. A magnetic write head according to claim 7, wherein the bonding agent comprises inorganic nanoparticles.

9. A magnetic write head according to claim 1, wherein the bonding agent comprises a polyimide polymer.

10. A magnetic write head according to claim 9, wherein the polyimide polymer is fluorinated.

11. A magnetic write head according to claim 1, wherein the air gap has dimensions that range from between about 0.25 μm and about 1.0 μm.

12. A magnetic write head according to claim 1, wherein the air gap has an aspect ratio of between about 5 and about 6.

13. A method comprising:
    attaching a laser diode to a slider of a magnetic write head, wherein a light-emitting edge or surface of the laser diode is adjacent to an optical waveguide, wherein the light-emitting edge or surface of the laser diode and the optical input of the waveguide define an aligned direction, and wherein an air gap extends from the light-emitting edge or surface of the laser diode in a direction perpendicular to the aligned direction; and
    depositing a focused stream of bonding agent on at least one corner between the laser diode and the slider after the attachment, wherein the bonding agent fills the air gap therebetween.

14. A method according to claim 13, wherein the focused stream is focused aerodynamically.

15. A method according to claim 13, wherein after depositing the bonding agent, the laser diode is optically coupled to the optical waveguide coupler through the bonding agent.

16. A method according to claim 13, wherein the aerodynamically focused stream of bonding agent is deposited through an aerosol jet dispenser.

17. A method according to claim 13, wherein the bonding agent is surrounded by a sheath gas.

18. A method according to claim 13, wherein the aerodynamically focused stream of bonding agent comprises droplets with diameters of between about 1 μm and 5 μm.

19. A method according to claim 13, wherein aerodynamically focused stream of bonding agent is dispensed at an angle of about 45 degrees from the aligned direction.

20. A method according to claim 13, further comprising curing the bonding agent.

* * * * *